(12) United States Patent
Aselage et al.

(10) Patent No.: US 9,067,557 B1
(45) Date of Patent: Jun. 30, 2015

(54) ACTIVE BOLSTER WITH HEAT-STAKED REINFORCEMENT

(71) Applicant: FORD GLOBAL TECHNOLOGIES, LLC, Dearborn, MI (US)

(72) Inventors: Brandon M. Aselage, White Lake, MI (US); Sean B. West, Monroe, MI (US); Stacey H. Raines, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/330,542

(22) Filed: Jul. 14, 2014

(51) Int. Cl.
*B60R 21/206* (2011.01)
*B60R 21/231* (2011.01)

(52) U.S. Cl.
CPC ..... *B60R 21/206* (2013.01); *B60R 2021/23169* (2013.01)

(58) Field of Classification Search
CPC ............ B60R 21/206; B60R 2021/23169; B60R 2021/23571
See application file for complete search history.

(56) References Cited

U.S. PATENT DOCUMENTS

| | | | | |
|---|---|---|---|---|
| 5,630,620 | A * | 5/1997 | Hirai et al. | 280/743.1 |
| 6,213,497 | B1 * | 4/2001 | Spencer et al. | 280/730.1 |
| 6,220,629 | B1 * | 4/2001 | Wipasuramonton et al. | 280/743.1 |
| 6,355,123 | B1 * | 3/2002 | Baker et al. | 156/90 |
| 6,976,706 | B2 | 12/2005 | Smith et al. | |
| 8,491,008 | B2 | 7/2013 | Roychoudhury et al. | |
| 8,544,876 | B2 | 10/2013 | Best et al. | |
| 8,579,325 | B2 | 11/2013 | Roychoudhury | |
| 8,720,948 | B2 * | 5/2014 | Raines et al. | 280/752 |
| 2004/0155447 | A1 * | 8/2004 | Smith et al. | 280/753 |
| 2005/0023802 | A1 * | 2/2005 | Enders et al. | 280/728.2 |
| 2008/0061537 | A1 * | 3/2008 | Enders | 280/730.1 |
| 2009/0250915 | A1 * | 10/2009 | Best et al. | 280/742 |
| 2012/0018987 | A1 * | 1/2012 | Matsushima et al. | 280/730.2 |
| 2012/0112439 | A1 | 5/2012 | Roychoudhury | |
| 2012/0267878 | A1 * | 10/2012 | Kalisz et al. | 280/728.2 |

* cited by examiner

*Primary Examiner* — Drew Brown
(74) *Attorney, Agent, or Firm* — Vichit Chea; MacMillan, Sobanski & Todd, LLC

(57) ABSTRACT

An active bolster for an interior trim surface of a vehicle has a trim panel with a closed-loop bonding section on an inside surface. A first stud extending from an inside trim panel surface at the closed-loop bonding section, and a second stud extends from the panel inside surface radially outward of the bonding section. A thermoplastic expandable bladder member has a welding flange along an peripheral edge which is hot-welded with the bonding section. The welding flange has a stud aperture receiving the first stud. A stepped bracket comprises a first plate overlying the welding flange and a second plate overlying the trim panel. The first plate has a first aperture receiving the first stud. The second plate has a second aperture receiving the second stud. The studs have respective re-melted heads clamping the bracket in place.

13 Claims, 4 Drawing Sheets

ACTIVE BOLSTER WITH HEAT-STAKED REINFORCEMENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to increasing robustness of the bonding between an expandable bladder member and a trim wall which are separately molded.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall (e.g., trim panel) that faces a vehicle occupant attached to an inner bladder wall along a sealed periphery. One or both of the walls is deformable in order to provide an inflatable bladder. For example, the inner wall may have a pleated (i.e., accordion-like) region that straightens out during inflation. The walls are initially spaced apart by a small amount when in their pre-deployment, non-inflated condition. This allows ingress of the inflation gas in a manner that can achieve an even inflation across the panel.

The inner and outer walls of a typical active bolster are comprised of molded thermoplastics such as polyethylene, polyolefin, or PVC. They are typically injection molded but can also be blow molded. When formed separately, the walls must be hermetically joined around their periphery in order to form the inflatable bladder. The joint must be strong to resist separation as a result of the high pressures during inflation.

A known method of sealing the bladder walls is by hot welding, which involves heating of the matching surfaces and then compressing them together. Examples include hot plate welding, IR welding, and laser welding. A generally planar welding flange has been provided around the outer perimeter of the inner bladder wall which is received by a bonding section on a generally planar surface of the outer wall. The outer wall and/or inner surfaces may also include upstanding sealing ribs that increase the weld strength by penetrating and fusing with the welding flange or other opposing surface during the hot welding process in which the areas to be welded are heated and then compressed. Despite the penetration of the sealing ribs, weld separation has continued to be a potential failure mode for active bolsters—particularly at regions of highest stress such as at a corner of the weld.

SUMMARY OF THE INVENTION

In one aspect of the invention, an active bolster is provided for an interior trim surface of an automotive vehicle. A thermoplastic outer trim panel has a closed-loop bonding section on an inside surface. The trim panel includes a first stud extending from the inside surface at the closed-loop bonding section and a second stud extending from the inside surface radially outward of the closed-loop bonding section. A thermoplastic expandable bladder member has a central attachment section configured to attach to a support structure of the vehicle, a welding flange along an peripheral edge, and a baffle section between the central attachment section and the welding flange. The welding flange has a stud aperture receiving the first stud. A stepped bracket comprises a first plate overlying the welding flange and having a first aperture receiving the first stud. The bracket also comprises a second plate overlying the trim panel inside surface and having a second aperture receiving the second stud. The studs have respective re-melted heads clamping the bracket in place. An inflator is couples an inflation gas into a space between the trim panel and bladder member to expand the bladder member in response to a crash event of the vehicle.

DETAILED DESCRIPTION OF PREFERRED EMBODIMENTS

Figure 1:
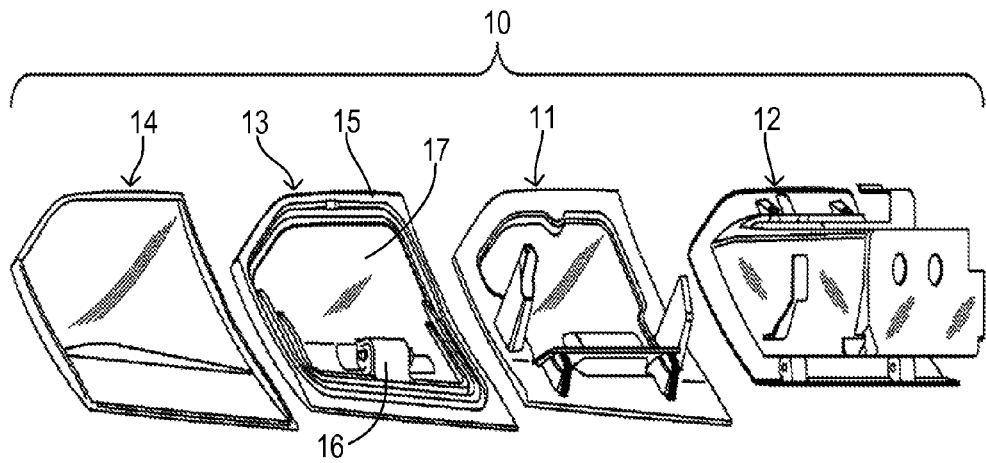
FIG. 1 is an outward-looking, exploded perspective view of a prior art active knee bolster glove box door system of a type to which the present invention can be applied.

Referring now to FIG. 1, a prior art active knee bolster system 10 has a base panel component 11 which forms the support structure or foundation for the bolster. Base 11 may be part of a glove box door which is attached to the vehicle by hinging from a storage cavity or glove box 12 as shown in FIG. 1. Alternatively, the active bolster can be mounted to another support structure such as an instrument panel support below a steering column, for example. Such locations interface to the knees of an individual riding in a corresponding seating position within a vehicle. The bolster may also be placed for protecting other body areas, such as a bolster mounted on a ingress/egress door for torso protection.

Base 11 acts as a reaction surface for supporting an inflatable bladder formed by an inner wall (bladder member) 13 and an outer (trim panel) wall 14 that are joined around their periphery 15. Walls 13 and 14 are preferably comprised of molded plastics (such as thermoplastic polyolefin (TPO)) and are joined by plastic hot-welding, such as hot plate welding, to form a peripheral seal around a central region 17 for forming a bladder. An inflation gas source (i.e., inflator) 16 is electronically controlled for activating during a crash to release gas to inflate the bolster. Outer wall 14 may comprise the Class A interior trim surface such as the outside of the glove box door, or an additional skin or cover (not shown) can be applied to its outer surface.

Figure 2:
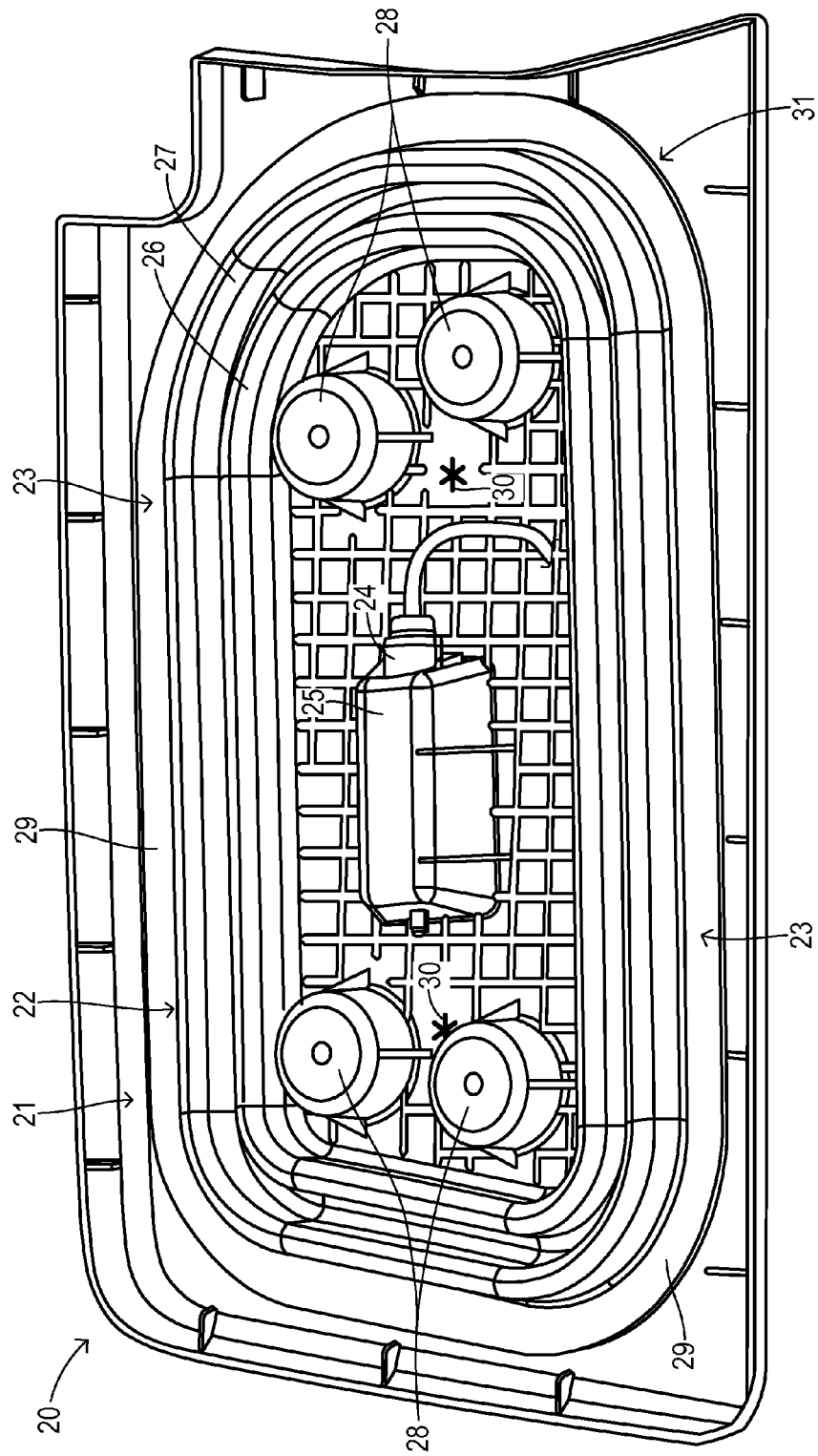
FIG. 2 is a rear perspective view of an outer trim panel and bladder wall assembly of a prior art active bolster.

FIG. 2 is a rear view of another prior art embodiment of an inflatable bladder 20. A plastic-molded outer trim panel wall 21 overlies a plastic-molded, expandable inner bladder wall 22. Walls 21 and 22 are joined around a closed perimeter region 23 to form an inflatable bladder having an open central volume between walls 21 and 22 to receive an inflation gas during a crash event from an inflator 24 mounted in a recess 25 of bladder wall 22. Bladder wall 22 includes a plurality of pleats, such as 26 and 27, to accommodate the expansion of bladder wall 22 during inflation. A plurality of bosses or towers 28 are used to mount bladder wall 22 to a vehicle support structure acting as a reaction surface. A welding flange 29 extends circumferentially around bladder wall 22. Vent holes 30 comprised of an asterisk-shaped pattern cut through bladder wall 22 may be included for venting the central volume prior to and during deployment.

Depending on the bladder layout, inflator placement, and other factors, certain positions around the periphery of a weld may be more highly susceptible to potential weld failures. For example, bladder wall 22 and welding flange 29 are shown with an oblong shape, and shear stresses that can cause failure of a weld may be concentrated at a corner, such as a corner 31. Thus, the weld strengthening disclosed in the present invention can be utilized over the full periphery of a bladder wall or only at one or a limited number of critical locations around the periphery.

Figure 3:
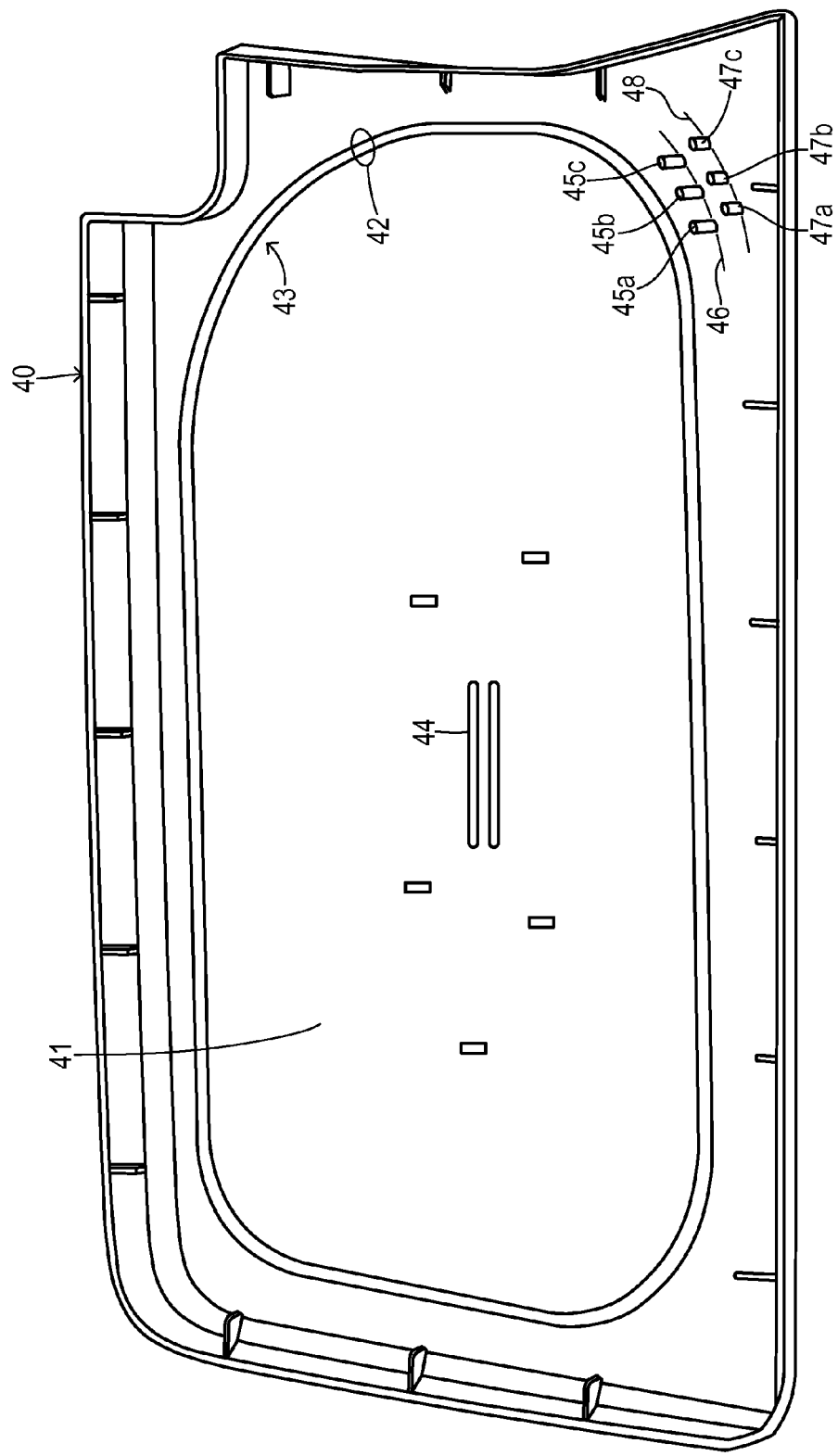
FIG. 3 is a perspective view of one embodiment of an outer trim panel of the present invention with the bladder wall removed.

FIG. 3 shows an outer trim wall 40 (with the inner bladder wall removed) having an inner surface 41 that faces the bladder wall when assembled. A welding rib 42 follows a closed perimeter 43 to form a closed-loop bonding section to be joined with the welding flange of a mating bladder wall 22 (not shown) by hot welding. Ribs 44 are provided for supporting the inflator.

In order to increase the strength of the hermetic seal weld joint, a heat staked clamping bracket is disposed over the welding flange along the periphery at least at the location or locations subject to the highest potential of weld failure. Heat staking of a clamp involves the use of a plurality of studs extending from inside surface 41 of trim panel 40.

In a preferred embodiment shown in FIG. 3, a first set of studs 45 includes studs 45a, 45b, and 45c disposed along a radial arc 46 that is coincident with the welding flange (not shown). Arc 46 follows the shape of the welding flange and of welding rib 42 according to the placement along closed perimeter 43 where the reinforcement bracket is being located. A second set of studs 47 includes studs 47a, 47b, and 47c disposed along a second radial arc 48 which is spaced radially outward from the welding flange as explained below. First set of stub of studs 45 are taller than second set of studs 47 because they pass through both the welding flange and the clamping bracket as explained below.

Figure 4:
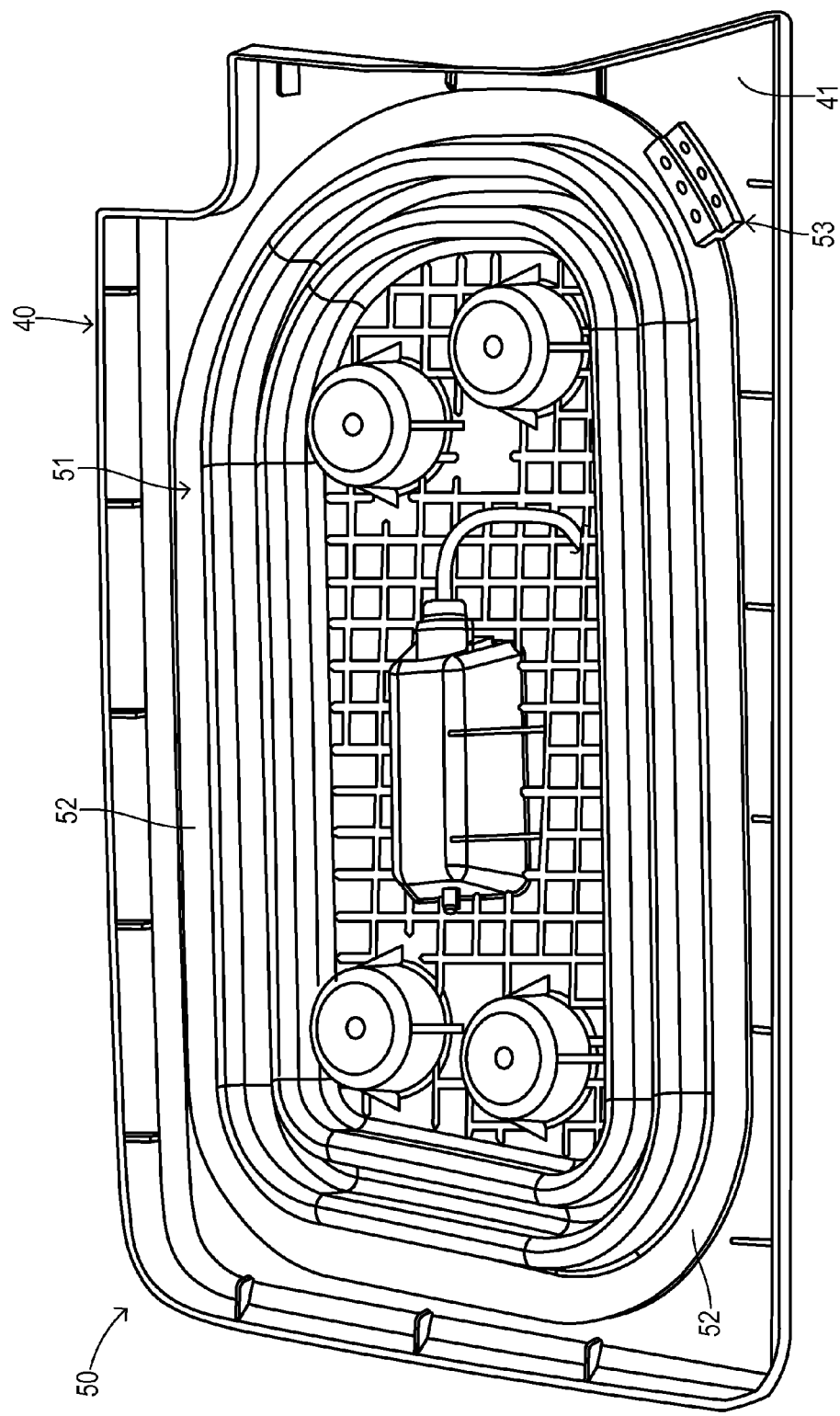
FIG. 4 is a rear perspective view of an outer trim panel and bladder wall assembly of the present invention with a heat-staked bracket supplementing the peripheral attachment of the bladder wall to the trim panel.

FIG. 4 shows an active bolster 50 wherein trim wall 40 has been hot welded to a bladder wall 51 along a welding flange 52 of bladder wall 51. A stepped bracket 53 overlies welding flange 52 and inner surface 41 of trim panel 40, with studs 45 and 47 being heat staked over clamping bracket 53 to keep it in place.

Figure 5:
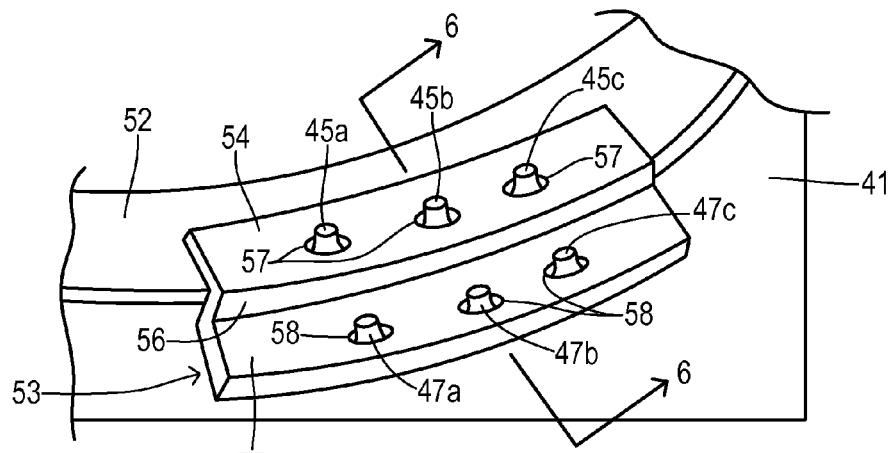
FIG. 5 is a perspective view of the stepped bracket assembled to the first and second sets of studs before being re-melted by hot staking.

FIG. 5 shows the heat-staked clamping bracket in greater detail. Bracket 53 has a first plate 54 overlying welding flange 52 and a second plate 55 overlying trim panel inner surface 41. Plates 54 and 55 are joined by a transverse web 56. First plate 54 has a plurality of apertures 57 arranged to receive respective studs of the first set of studs 45. Second plate 55 has a plurality of apertures 58 arranged to receive respective studs of the second set of studs 47. Flange 52 includes corresponding apertures (not shown) for receiving first set of studs 45. FIG. 5 shows studs 45 and 47 prior to heat staking in order to illustrate how bracket 53 is initially put into place. Furthermore, FIG. 5 shows an assembly state wherein welding flange 52 has already been hot-plate welded to the closed-loop bonding section of trim panel 40.

Figure 6:
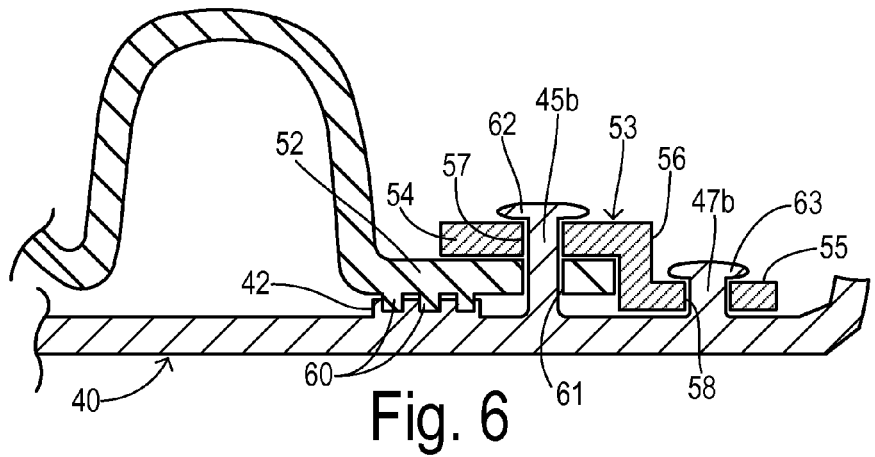
FIG. 6 is a cross-sectional view along line 6-6 of FIG. 5 after hot staking.

FIG. 6 is a cross-sectional view after performing heat staking on studs 45 and 47. Welding flange 52 includes welding ribs 60 that have been hot-plate welded with welding rib 42 of trim panel 40. First stud 45b extends through a corresponding aperture 61 which is one of a plurality of apertures in welding flange 52 arranged to receive the first set of studs 45. Stud 45b further extends through aperture 57 in stepped bracket 53. Second stud 47b extends through aperture 58 in second plate 55. Studs 45b and 47b have been heat staked in FIG. 6 by an appropriate tool (not shown) in order to create respective re-melted heads 62 and 63 to clamp bracket 53 in place, thereby strengthening the hermetic seal with a minimum of added components and a minimum of incremental processing. Stepped bracket 53 may be comprised of thermoplastic material similar to the trim panel and bladder wall or can be comprised of metal such as stamped sheet metal or steel for increased rigidity.

What is claimed is:

1. An active bolster for providing an interior trim surface of an automotive vehicle, comprising:
   a thermoplastic outer trim panel having a closed-loop bonding section on an inside surface, wherein the trim panel includes a first stud extending from the inside surface at the closed-loop bonding section and a second stud extending from the inside surface radially outward of the closed-loop bonding section;
   a thermoplastic expandable bladder member having a central attachment section configured to attach to a support structure of the vehicle, a welding flange along an peripheral edge, and a baffle section between the central attachment section and the welding flange, wherein the welding flange has a stud aperture receiving the first stud;
   a stepped bracket comprising a first plate overlying the welding flange and having a first aperture receiving the first stud, and comprising a second plate overlying the trim panel inside surface and having a second aperture receiving the second stud, wherein the studs have respective re-melted heads clamping the bracket in place; and
   an inflator for coupling an inflation gas into a space between the trim panel and bladder member to expand the bladder member in response to a crash event of the vehicle.

2. The active bolster of claim 1 wherein the first stud is taller than the second stud.

3. The active bolster of claim 1 wherein the first stud is one of a plurality of first studs extending from the inside surface at the closed-loop bonding section, wherein the second stud is one of a plurality of second studs extending from the inside surface radially outward of the closed-loop bonding section, wherein the first plate has a plurality of first apertures receiving respective ones of the first studs, wherein the second plate has a plurality of second apertures receiving respective ones of the second studs, and wherein the first and second plurality of studs have respective re-melted heads clamping the bracket in place.

4. The active bolster of claim 1 wherein the first and second plates of the stepped bracket are joined by a transverse web.

5. The active bolster of claim 1 wherein the closed-loop bonding section and the welding flange include a plurality of hot-welding ribs.

6. The active bolster of claim 1 wherein the stepped bracket is comprised of plastic.

7. The active bolster of claim 1 wherein the stepped bracket is comprised of metal.

8. An active bolster comprising:
   a trim panel having a bonding section and first and second sets of studs;
   a bladder member including an outer welding flange with stud apertures receiving the first studs, the flange being hot-welded to the bonding section; and
   a stepped bracket with respective plates overlying the welding flange and the trim panel, the plates having respective apertures receiving the studs, the studs having re-melted heads clamping the bracket in place.

9. The active bolster of claim 8 wherein the first set of studs is disposed on an inner surface of the trim panel along a first radial arc coincident with the welding flange.

10. The active bolster of claim 9 wherein the second set of studs is disposed on an inner surface of the trim panel along a second radial arc radially spaced from the welding flange.

11. The active bolster of claim 10 wherein the studs of the first set of studs are taller than the studs of the second set of studs.

12. The active bolster of claim 8 wherein the stepped bracket is comprised of plastic.

13. The active bolster of claim 8 wherein the stepped bracket is comprised of metal.

* * * * *